(12) United States Patent
Saeger et al.

(10) Patent No.: US 10,179,493 B2
(45) Date of Patent: Jan. 15, 2019

(54) SYSTEM AND METHOD FOR OPERATING A VEHICLE HAVING AN ACTIVE ROLL CONTROL SYSTEM

(71) Applicant: Ford Global Technologies, LLC, Dearborn, MI (US)

(72) Inventors: Martin Saeger, Pulheim (DE); Simon Baales, Cologne (DE); Michael Seemann, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/411,712

(22) Filed: Jan. 20, 2017

(65) Prior Publication Data

US 2017/0210191 A1 Jul. 27, 2017

(30) Foreign Application Priority Data

Jan. 22, 2016 (DE) ........................ 10 2016 200 930

(51) Int. Cl.
| | |
|---|---|
| *B60G 17/016* | (2006.01) |
| *B60G 11/27* | (2006.01) |
| *B60G 17/015* | (2006.01) |
| *B60G 17/052* | (2006.01) |
| *B60G 17/0185* | (2006.01) |
| *B60G 21/055* | (2006.01) |

(52) U.S. Cl.
CPC ......... *B60G 17/0162* (2013.01); *B60G 11/27* (2013.01); *B60G 17/0155* (2013.01); *B60G 17/0185* (2013.01); *B60G 17/0528* (2013.01); *B60G 21/0555* (2013.01); *B60G 2202/152* (2013.01); *B60G 2500/204* (2013.01); *B60G 2500/22* (2013.01); *B60G 2500/30* (2013.01); *B60G 2600/08* (2013.01); *B60G 2800/012* (2013.01); *B60G 2800/80* (2013.01); *B60G 2800/9122* (2013.01)

(58) Field of Classification Search
CPC ............ B60G 17/0162; B60G 17/0528; B60G 17/0155; B60G 11/27; B60G 2500/204; B60G 2800/9122; B60G 2800/012; B60G 2600/08; B60G 2202/152
USPC ....................................... 280/5.519
See application file for complete search history.

(56) References Cited

U.S. PATENT DOCUMENTS

| | | | | |
|---|---|---|---|---|
| 4,886,291 | A | * 12/1989 | Okamoto ........... | B60G 17/0185 280/5.501 |
| 5,032,997 | A | * 7/1991 | Kawagoe ........... | B60G 17/0163 180/404 |
| 5,070,284 | A | * 12/1991 | Patil ....................... | B60G 13/02 188/266.8 |
| 2005/0212224 | A1 | 9/2005 | Osterlanger et al. | |

(Continued)

FOREIGN PATENT DOCUMENTS

EP 2308703 A1 4/2011

*Primary Examiner* — Drew J Brown
(74) *Attorney, Agent, or Firm* — Raymond L. Coppiellie; Burgess Law Office, PLLC

(57) ABSTRACT

A system and method for operating a motor vehicle having an active roll control system and an air suspension system including operating the air suspension system in a normal mode, according to a normal air spring setting. Upon determining a fault or malfunction of the active roll control system operating the air suspension in a fallback mode, according to a fallback air spring setting, wherein the fallback mode is different from the normal mode.

10 Claims, 3 Drawing Sheets

(56) References Cited

U.S. PATENT DOCUMENTS

| | | | |
|---|---|---|---|
| 2006/0293816 A1* | 12/2006 | Li | B60G 17/0155 |
| | | | 701/38 |
| 2008/0054537 A1* | 3/2008 | Harrison | B60G 17/016 |
| | | | 267/64.16 |
| 2013/0060423 A1* | 3/2013 | Jolly | B60G 17/0152 |
| | | | 701/38 |
| 2013/0322996 A1* | 12/2013 | Chapman | B60P 1/433 |
| | | | 414/495 |
| 2014/0195115 A1* | 7/2014 | Muller | B60G 21/00 |
| | | | 701/37 |
| 2017/0182859 A1* | 6/2017 | Anderson | B60G 17/052 |

* cited by examiner

SYSTEM AND METHOD FOR OPERATING A VEHICLE HAVING AN ACTIVE ROLL CONTROL SYSTEM

CROSS-REFERENCE TO RELATED APPLICATIONS

Not Applicable.

BACKGROUND OF THE INVENTION

1. Field of the Invention

The invention relates to a method for operating a motor vehicle having an active roll control system and an air suspension system.

2. Description of Related Art

Roll control systems in motor vehicles counteract a rolling movement of the vehicle when unevenness on the road or cornering causes a wheel to experience spring compression or spring extension. The roll control system transmits vehicle body movement, generated by spring compression or extension, to the opposite side of the vehicle wherein a torsional property of the roll control system causes damping and deceleration of the transmission. Roll control systems can be provided on the front axle, the rear axle, or on the rear and front axles of the motor vehicle.

Active roll control systems (ARC) are becoming increasingly widespread in vehicles with a high center of gravity and in sport vehicles. In this context, the rolling properties of the vehicle are adapted to different driving situations and driver preferences by changing the mechanical transmission behavior of the roll control system. For example, a "more direct" or "harder" transmission may be desired in a "sport" operating mode, or the understeering behavior of the motor vehicle during cornering may be influenced.

In the motor vehicle industry, air suspension systems constitute a widespread alternative to coil springs and leaf springs. These systems include air-filled bellows that bring about the desired spring effect. A level of the air spring can also be changed by changing the air pressure of the air in the bellows, which can be used, for example, for lowering the bodywork when traveling at a high speed, or to permit easier entry into the motor vehicle. The volume of the air spring can be changed by, for example, connecting an additional volume through a valve. In this way, the spring constant of the air spring can be changed, and in the case of an increase in volume it is reduced, which results in softer suspension. An air suspension system with an adaptable spring constant can be used for convenience functions similar to those explained above for active roll control systems.

SUMMARY OF THE INVENTION

A method for operating a motor vehicle including providing an active roll control system and an air suspension system. Operating the air suspension system in a normal operating mode according to a normal air spring setting and checking for a malfunction of the active roll control system. If a malfunction of the active roll control system is detected, operating the air suspension in a fallback operating mode according to a fallback air spring setting different from the normal air spring setting.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
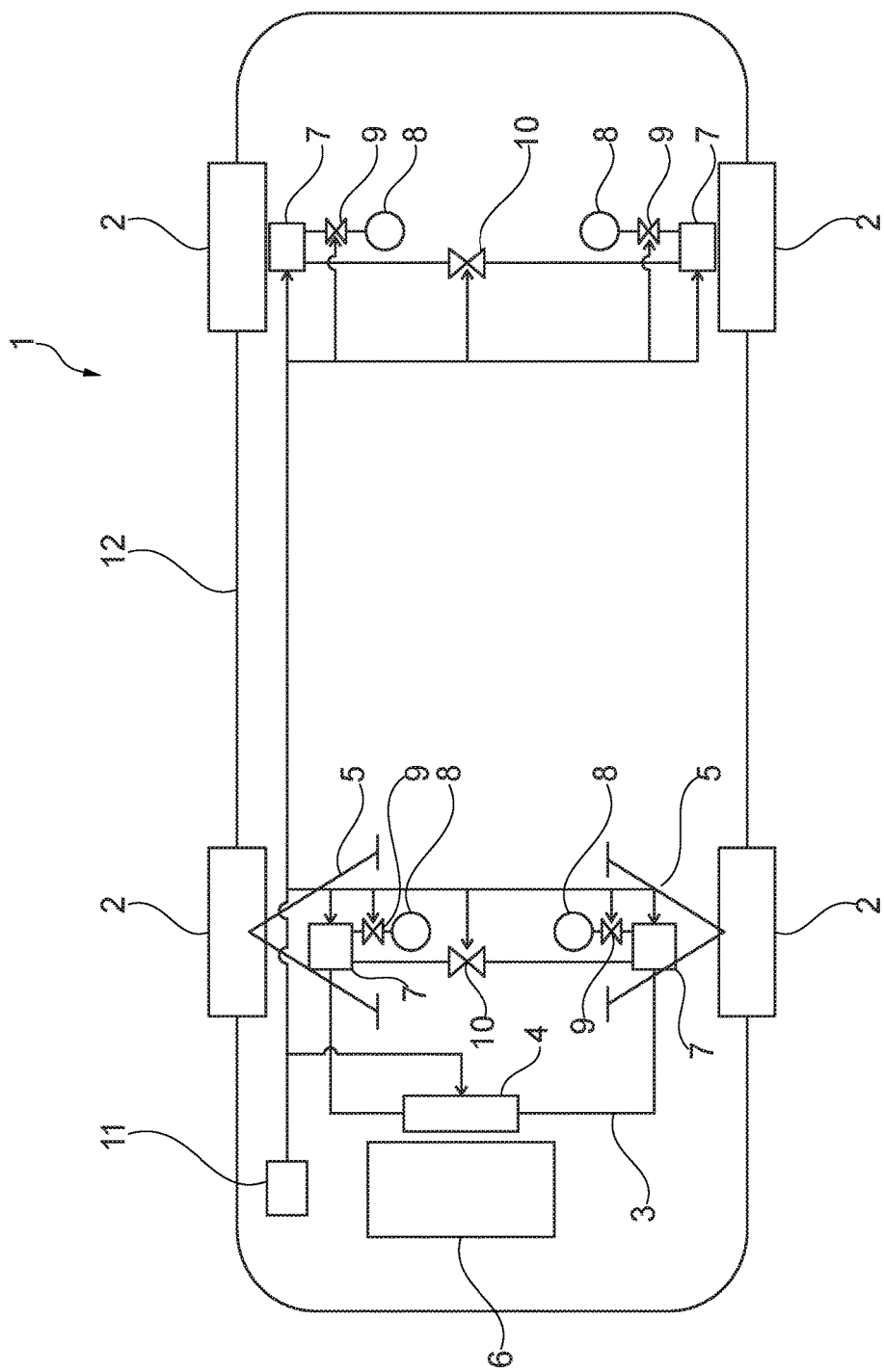
FIG. 1 is a schematic, block diagram of a motor vehicle according to an embodiment of the invention.

FIG. 1 shows a motor vehicle 1 according having front and rear wheels 2, the front wheels mounted on individual wheel suspension units 5. The rear wheels 2 mounted either on individual wheel suspension units or on a common axle. In the exemplary embodiment shown, air springs 7 are provided on all the wheels 2 or their suspension units. It is also possible for air springs 7 to be used only at the front or only at the rear of the motor vehicle 1. The motor vehicle 1 includes an engine 6 arranged at the front; however, other engine configurations and mountings are also contemplated.

The motor vehicle 1 includes a roll control system 3 equipped with an actuator 4 and is suitable for an active roll control method. In the exemplary embodiment shown, the roll control system 3 is provided on the front wheels 2 of the motor vehicle 1, a roll control system according to the present embodiment can also be provided at the rear wheels 2. The roll control system 3 connects at opposite ends to the wheel suspension units 5 of the front wheels 2 and transmits a displacement of a wheel 2 to the wheel 2 on the opposite side of the vehicle. An actuator 4 controls the transmission to achieve a desired dynamic behavior of the motor vehicle 1. A control unit 11 monitors the roll control system and upon detection of a malfunction of the roll control system 3, for example a failure of the actuator 4, provides control signals for taking suitable measures to maintain the dynamic driving behavior of the motor vehicle 1 in a fallback operating mode. The control unit 11 connects to the air spring 7. The control unit 11 can be a component already provided for other purposes, for example an engine control unit of the engine 6 or a comparable device.

In the exemplary embodiment shown, the air springs 7 connect to pressure vessels 8 via first throttle valves 9. The throttle valves 9 opened or closed to vary the overall volume of the air springs 7. If the overall volume of an air spring 7 is increased, the associated throttle valve 9 is opened or opened further, the spring constant of the air spring 7 decreases because a relatively large avoidance space is available to the expulsion volume moved or compressed over a certain spring distance, so that overall less compression work is performed. The pressure vessels 8 may be provided only at the front or rear air spring 7.

The exemplary embodiment of FIG. 1 shows a transverse connection between the air springs 7 respectively arranged on opposite sides of the vehicle. Second throttle valves 10 in the transverse connection can be opened, closed, or have a selectable flow resistance applied to them. The greater the connection or throttle valves 10 between the air springs 7 lying opposite one another is opened, the more volume can be displaced between the air springs 7, whereby the air springs counteract a rolling movement less when the throttle valve 10 is opened than when closed. The transverse connection between the air springs 7 also controls the rolling behavior of the motor vehicle 1 in the event of the roll control system 3 having a malfunction.

In various embodiments, a transverse connection can be provided only at the front air spring 7, only at the rear air spring 7, or at both the front and the rear air springs 7.

A control unit 11 connects to the actuator 4 of the roll control system 3, the first and second throttle valves 9, 10, and the air springs 7 and controls these components. In particular, the control unit 11 can predefine a pressure in the air springs 7 and an open state of the throttle valves 9, 10 in a variable fashion.

Figure 2:
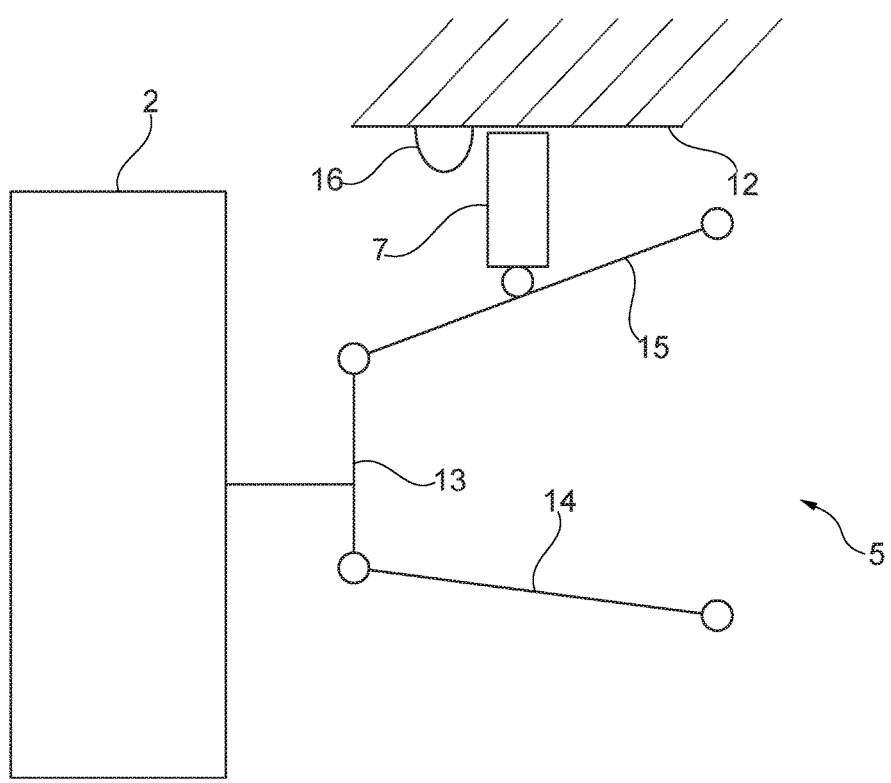
FIG. 2 is a schematic, block diagram of a wheel suspension unit with an air spring.

FIG. 2 shows an exemplary embodiment of a wheel suspension unit with an air spring 7. Numerous variants of wheel suspension units are known which can also be used within the scope of the invention. An exemplary wheel suspension unit 5 for a wheel 2 has a wheel carrier or knuckle 13, pivotably connected to a lower transverse link 14 and an upper transverse link 15, each of which are pivotably mounted. While in the example shown, the air spring 7 engages the upper transverse link 15, the air spring 7 may also engage the lower transverse link 14, which makes available a relatively large installation space for the air spring 7 but requiring adaptations to the upper transverse link 15. The configuration in FIG. 2 selected for reasons of simpler illustration, without wishing to express a preference within the scope of the invention.

The air spring 7 connects at one end to the upper transverse link and at its other end to the vehicle body 12. A stop buffer 16, formed for example from hard rubber and having a parabolic cross sectional area, is provided. The stop buffer 16 is arranged on the vehicle body 12, but could also be arranged on the wheel suspension unit 5, for example on the upper transverse link 15.

In the fallback operating mode there can be provision for the pressure in the air spring 7 to be lowered to an extent that the vehicle body 12 rests with the stop buffer 16 on the wheel suspension unit 5. The spring constant of the stop buffer 16 larger by orders of magnitude brings about, together with the simultaneously lowered center of gravity of the motor vehicle 1, an increased resistance to rolling and better understeer behavior of the motor vehicle 1 in the event of a fault.

Figure 3:
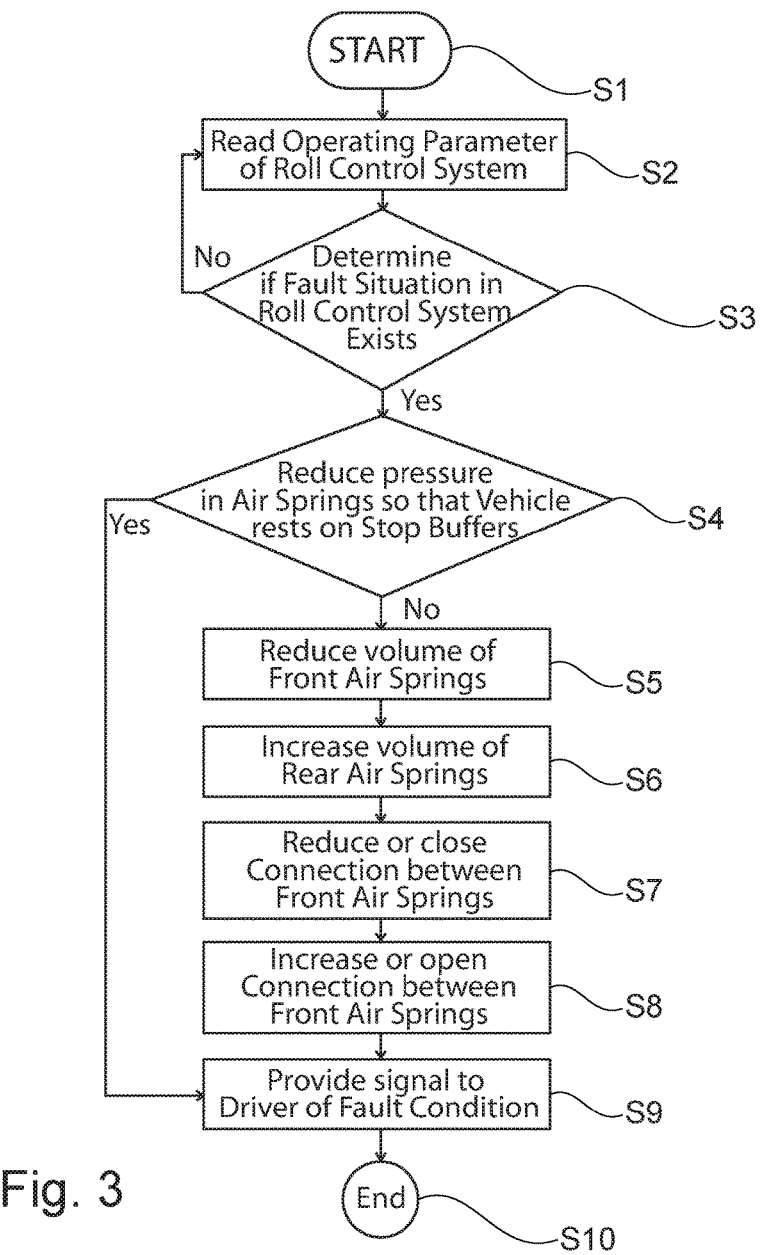
FIG. 3 is a flowchart of a schematic sequence of an exemplary embodiment of the method according to the invention.

FIG. 3 is a flowchart of an exemplary embodiment of the method according to the invention. The method starts in step S1, in step S2 a suitable operating parameter of the roll control system is read out, and in step S3, it is checked whether a fault situation of the roll control system 3 is present. If a fault situation does not exist, then the system branches back to step S2 directly or after a predetermined time has passed, and the air spring continues to be operated with a normal air setting. Instead of an operating parameter of the roll control system, a fault situation of the roll control system can also be detected based on other suitable parameters of the motor vehicle 1 without restricting the scope of the invention.

In contrast, if a fault situation of the roll control system 3 exists in step S3, the setting of the air spring is changed in the subsequent steps to a fallback air spring setting. For this purpose, in step S4, the pressure in the air springs is reduced thereby lowering the vehicle body of the motor vehicle, which also lowers the center of gravity of the motor vehicle relative to the wheel suspension units. In this context, the pressure in the air springs can be reduced to such an extent that the vehicle body rests on the stop buffers and steps S5 to S8 can be omitted.

In step S5, when air springs are present with a variable volume the volume of the front air springs can be reduced to increase the spring constants of these air springs. In step S6, the volume of the rear air springs can be increased to lower the spring constants of the rear air springs. Improved understeer and rolling behavior are achieved by these measures.

In step S7, a transverse connection between the front air springs can be reduced or closed. In step S8 there can be provision for a transverse connection between the rear air springs to be opened or opened further. Finally, in step S9, by means of audible and/or visual signals the driver of the motor vehicle can be made aware of the fault situation, which changes the dynamic behavior of the motor vehicle and therefore constitutes a possible cause of vehicle rolling. The method ends in step S10.

The steps S4 to S8 can be carried out simultaneously or successively in any desired sequence. In addition, individual steps can be omitted depending on the embodiment or configuration of the air suspension system of the motor vehicle; for example air springs front/rear, variable air spring volume front/rear, or transverse connection between the air springs front/rear.

The embodiment of the present method and system improves the dynamic behavior of a motor vehicle with an active roll control system and an air suspension system when the active roll control system has faulty behavior. As shown sufficient resistance to rolling and a desired understeer behavior of the motor vehicle can be ensured even during a failure of the active roll control system.

In one embodiment the system and method includes an active roll control system and an air suspension system. The air suspension system operates in a normal operating mode according to a normal air spring setting while determining whether a malfunction of the active roll control system exists. If a fault exists, operating the air suspension in a fallback operating mode according to a fallback air spring setting that is different from the normal air spring setting.

In one embodiment, the active roll control system is arranged at the front in the motor vehicle, but an active roll control system may additionally or alternatively be provided at the rear of the motor vehicle.

The air suspension system typically includes four air springs each arranged on respective wheel suspension units of the motor vehicle. An additional embodiment may include only the front or the rear wheel suspension having air springs.

When using active roll control systems it is problematic that in the event of a failure of the active roll control system or systems the motor vehicle can exhibit rolling behavior that is unaccustomed to the driver and is disadvantageous in terms of vehicle movement dynamics. To avoid this, an electric motor of the roll control system is conventionally short circuited in the case of a malfunction of the active roll control system, or if adjustable shock absorbers are used, they are placed in a hard setting. However, the short circuiting of the electric motor requires an additional self-conducting relay supplied with power during the entire operating period, resulting in increased fuel consumption, weight, and, under certain circumstances, packaging volume of the motor vehicle. The effect of the adjustment of the shock absorbers also depends on the height of the center of the gravity of the motor vehicle and on specific properties of the shock absorbers themselves.

As set forth above, when using the air suspension system for improved roll stabilization of the motor vehicle the operating parameters of the air suspension system are adapted such that with a malfunction of the active roll control system the air suspension system operates in a fallback operating mode.

In the fallback operation mode, the level of the motor vehicle is preferably lower at the fallback air spring setting than the level at the normal air spring setting. Lowering the vehicle level can be achieved by reducing the air pressure in the air suspension system thereby reducing the height of the air springs and consequently the height of the vehicle body above the wheel axles. Air spring adjustment in this manner lowers the center of gravity of the motor vehicle and correspondingly reduces the torque acting on the motor vehicle during rolling. The effect of this measure is pronounced with a motor vehicle with an engine arranged near to the front axle and a suspension system arranged at the front as an air suspension system, since the engine makes up a significant portion of the total mass of the motor vehicle.

In this context, the level of the motor vehicle according to the fallback air spring setting can be reduced to an extent wherein a wheel suspension system of the motor vehicle rests on stop buffers of a vehicle body of the motor vehicle. The stop buffers have a larger spring constant by several orders of magnitude compared to the air spring operated in the normal operating mode, thereby increasing the rigidity of the arrangement. This increases the resistance of the motor vehicle to rolling and strengthens an understeer behavior of the motor vehicle. Increased rigidity at the front axle of the motor vehicle also causes distribution of the rolling torque to the front axle, which additionally increases the stability of the motor vehicle during yawing.

In a further embodiment, a spring constant of a front air spring of the air suspension system of the motor vehicle is higher at the fallback air spring setting than at the normal air spring setting. For example, the motor vehicle can be equipped with air springs having a variable volume. Increasing the volume causes the spring constant to decrease, and vice versa. The increasing of the spring constant of the air springs at the front axle has effects similar to those described for the resting of the vehicle body on the stop buffers, but constitutes a less drastic intervention to the dynamic behavior of the motor vehicle.

In addition, a spring constant of a rear air spring of the air suspension system of the motor vehicle according to the fallback air spring setting can be increased compared to the normal air spring setting. The adjustment of the spring input constant/constants can advantageously be combined with lowering of the vehicle body by decreasing the air pressure in the air springs.

A further embodiment includes reducing a passage between a left hand front air spring of the air suspension of the motor vehicle and a right hand front air spring of the air suspension system of the motor vehicle in the fallback air spring setting compared to the normal air spring setting. In this embodiment the motor vehicle has a transverse connection between the air springs arranged on the vehicle sides lying opposite one another, for example a throttle valve. The reduction of the passage with a malfunction of the active roll control system increases the resistance of the motor vehicle to rolling. In addition, a passage between a left hand rear air spring of the air suspension system of the motor vehicle and a right hand rear air spring of the air suspension system of the motor vehicle can be larger according to the fallback air spring setting than according to the normal air spring setting.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for operating a motor vehicle comprising:
providing an active roll control system;
providing an air suspension system;
operating the air suspension system in a normal operating mode according to a normal air spring setting;
checking for a malfunction of the active roll control system;
if a malfunction of the active roll control system is detected, operating the air suspension in a fallback operating mode according to a fallback air spring setting different from the normal air spring setting; and
wherein a spring constant of a front air spring of the air suspension system of the motor vehicle is higher according to the fallback air spring setting than according to the normal air spring setting and a spring constant of a rear air spring of the air suspension system of the motor vehicle is lower according to the fallback air spring setting than according to the normal air spring setting.

2. The method of claim 1 wherein a level of the motor vehicle is lower according to the fallback air spring setting than according to the normal air spring setting.

3. The method of claim 1 wherein a passage between a left hand front air spring of the air suspension system of the motor vehicle and a right hand front air spring of the air suspension system of the motor vehicle is smaller according to the fallback air spring setting than according to the normal air spring setting.

4. The method of claim 1 wherein a passage between a left hand rear air spring of the air suspension system of the motor vehicle and a right hand rear air spring of the air suspension system of the motor vehicle is larger according to the fallback air spring setting than according to the normal air spring setting.

5. A method for operating a motor vehicle comprising:
providing an active roll control system;
providing an air suspension system;
operating the air suspension system in a normal operating mode according to a normal air spring setting;
checking for a malfunction of the active roll control system; and
if a malfunction of the active roll control system is detected, operating the air suspension in a fallback operating mode according to a fallback air spring setting different from the normal air spring setting wherein the level of the motor vehicle according to the fallback air spring setting is reduced to an extent that a wheel suspension system of the motor vehicle rests on a stop buffer of a vehicle body of the motor vehicle.

6. A system for operating a motor vehicle comprising:
an active roll control system;
an air suspension system;
a controller connected to said roll control system and the air suspension system, said controller receiving a signal from said active roll control system and detecting existence of a fault in said active roll control system, generating a signal based on said fault and sending said signal to said air suspension system to operate the air suspension system in a fallback mode, said fallback mode different from a normal mode;

wherein the air suspension system includes first and second front air springs, a passageway between said first and second front air springs, and a valve on said passageway between said first and second front air springs;

first and second front spring pressure vessels, a passageway between said first and second front air springs and said first and second front spring pressure vessels, and a valve on said passageway between said respective first and second front spring pressure vessels and said first and second front air springs;

first and second rear air springs and a passageway between said first and second rear air springs and a valve on said passageway between said first and second rear air springs;

first and second rear spring pressure vessels, a passageway between said first and second front air springs and said first and second rear spring pressure vessels, and a valve on said passageway between said respective first and second rear spring pressure vessels and said first and second front air springs;

a controller operating said valves to change the setting of the first and second front air springs and the first and second rear springs to the fallback operating mode wherein the level of the motor vehicle is lower than the level at the normal operating mode; and wherein a spring constant of one of said first and second rear air springs is lower in said fallback mode than in said normal mode.

7. The system of claim 6 wherein said valve between the first and second front air springs controls the size of said passage between said first and second front air springs; and
said passage between said first and second front air springs being smaller in said fallback mode than in said normal mode.

8. The system of claim 6 wherein said valve between the first and second rear air springs controls the size of said passage between said first and second rear air springs; and
said passage between said first and second rear air springs is larger in said fallback mode than in said normal mode.

9. The system of claim 6 wherein a spring constant of one of said first and second front springs is higher in said fallback mode than in said normal mode.

10. A system for operating a motor vehicle comprising:
an active roll control system;
an air suspension system; and
a controller connected to said roll control system and the air suspension system, said controller receiving a signal from said active roll control system and detecting existence of a fault in said active roll control system, generating a signal based on said fault and sending said signal to said air suspension system to operate the air suspension system in a fallback mode, said fallback mode different from a normal mode;

said air suspension system includes first and second front air springs, a passageway between said first and second front air springs, and a valve on said passageway between said first and second front air springs;

first and second front spring pressure vessels, a passageway between said first and second front air springs and said first and second front spring pressure vessels, and a valve on said passageway between said respective first and second front spring pressure vessels and said first and second front air springs;

first and second rear air springs and a passageway between said first and second rear air springs and a valve on said passageway between said first and second rear air springs;

first and second rear spring pressure vessels, a passageway between said first and second front air springs and said first and second rear spring pressure vessels, and a valve on said passageway between said respective first and second rear spring pressure vessels and said first and second front air springs;

a controller operating said valves to change the setting of the first and second front air springs and the first and second rear springs to the fallback operating mode wherein the level of the motor vehicle is lower than the level at the normal operating mode wherein the level of the motor vehicle in the fallback operating mode is lowered such that a wheel suspension system of the motor vehicle rests on a stop buffer of a vehicle body of the motor vehicle.

\* \* \* \* \*